United States Patent
Powers

(10) Patent No.: US 6,360,771 B2
(45) Date of Patent: Mar. 26, 2002

(54) TAPPING SLEEVE WITH A MECHANICAL JOINT ADAPTOR

(75) Inventor: Edward J. Powers, Aurora, IL (US)

(73) Assignee: Mary F. Powers, Aurora, IL (US)

( * ) Notice: Subject to any disclaimer, the term of this patent is extended or adjusted under 35 U.S.C. 154(b) by 0 days.

(21) Appl. No.: 09/770,718

(22) Filed: Jan. 29, 2001

Related U.S. Application Data

(63) Continuation-in-part of application No. 09/480,814, filed on Jan. 10, 2000, now Pat. No. 6,227,234.

(51) Int. Cl.[7] .............................. F16L 11/12; F16K 3/00
(52) U.S. Cl. ....................................... 137/322; 251/329
(58) Field of Search ................................. 137/322, 320, 137/15.23; 251/326, 329

(56) References Cited

U.S. PATENT DOCUMENTS

| | | | | |
|---|---|---|---|---|
| 2,608,992 A | * | 9/1952 | Folmsbee et al. | 137/322 X |
| 4,128,107 A | * | 12/1978 | Blumhardt | 137/322 X |
| 4,610,471 A | * | 9/1986 | Halen et al. | 285/337 |
| 4,637,641 A | * | 1/1987 | Kennedy, Jr. | 285/337 |
| 5,374,087 A | * | 12/1994 | Powers | 285/197 |
| 6,227,234 B1 | * | 5/2001 | Powers | 137/322 |

OTHER PUBLICATIONS

U.S. patent application, Ser. No. 09/480,814, filed Jan. 10, 2000, Edward J. Powers, Inventor.

\* cited by examiner

*Primary Examiner*—Kevin Lee
(74) *Attorney, Agent, or Firm*—Cook, Alex, McFarron, Manzo, Cummings & Mahler, Ltd.

(57) ABSTRACT

A tapping adaptor assembly for direct connection to a gate valve. The assembly includes a tapping adaptor attached to a main pipe. An outlet conduit formed integrally with and extend outwardly from the tapping adaptor terminates in a distal end outlet. A adaptor for mounting on the tapping adaptor includes an integral flange, a shoulder and a spout. The adaptor may be attached to the tapping adaptor by welding or glueing depending upon the material of the tapping adaptor or may be formed integrally with the outlet conduit. The flange of the adaptor has an annular face positioned to engage the gasket of the gate valve. The annular face may be recessed and an annular rim may be formed radially outwardly of the annular face. The spout of the mounting adaptor extends into the socket of the gate valve to help support the tapping sleeve. In an embodiment, a tapping sleeve semi-cylindrical section is formed integrally with the outlet conduit.

5 Claims, 6 Drawing Sheets

TAPPING SLEEVE WITH A MECHANICAL JOINT ADAPTOR

This is a continuation-in-part of my U.S. patent application, Ser. No. 09/480,814, filed Jan. 10, 2000 U.S. Pat. No. 6,227,234.

BACKGROUND AND SUMMARY OF THE INVENTION

Tapping sleeves are conventionally used to connect a branch pipe to a main pipe in a fluid supply system such as a waterworks, without shutting down the main pipe. This procedure is usually referred to as making a pressure tap because the fluid pressure is maintained in the main pipe while a connection is made to a branch pipe. The connection is made by cutting a hole in the pressurized main pipe using a power or manual tapping machine. The tapping machine extends into a branch outlet pipe on the tapping sleeve through a gate valve which is closed after a cutaway portion of the main pipe is removed by the tapping machine through the branch outlet pipe and the gate valve. The gate valve remains to control fluid flow from the main pipe through the later installed distribution piping supplied by the branch outlet pipe.

A specialized type of gate valve is presently used in making a pressure tap. This specialized tapping gate valve is equipped with a bolted flange having either a raised face or recessed face on its branch outlet pipe side and a mechanical joint on its tapping machine receiving side. The raised face or recessed face flange of the gate valve is bolted to a raised face or recessed face flange provided on the outlet end of the branch outlet pipe of the tapping sleeve. The raised or recessed faces are provided to insure vertical alignment of the gate valve with the outlet pipe of the tapping sleeves. A bolted flange joint has been considered necessary for use with a tapping sleeve so that the tapping cutter accurately cuts the opening in the main pipe and also withstands the large torque and axial thrust applied to the connection by the tapping machine.

The use of a bolted flange on the branch outlet pipe requires contractors to obtain and inventory specialized tapping gate valves which are equipped with a bolted raised face or recessed face flange on one side and a mechanical joint on the other side of the gate valve. Additionally, the time required to make a pressure tap using these specialized tapping gate valves is substantial because of the difficulty in connecting bolted flanges compared to the time required to complete mechanical joint connections.

Accordingly, it is an object of this invention to provide a tapping sleeve assembly for making a pressure tap which can be welded to the tapping sleeve outlet pipe and connected directly to a mechanical joint gate valve thereby eliminating the need for use of a specialized raised face or recessed face tapping valve.

Another object of this invention is a mechanical joint branch outlet pipe that is adaptable to both "bolt on" and "weld on" tapping sleeves or partial tapping sleeves.

Still another object of this invention is a tapping sleeve which may be used with conventional cast iron, steel or plastic pipe.

Yet another object of this invention is a tapping branch pipe sleeve having an integral mechanical joint adaptor.

A further object of this invention is a tapping sleeve branch pipe having an integral mechanical joint adaptor and an integral semi-circular tapping sleeve portion.

In its broadest aspect, this invention provides a pressure tap connection that incorporates all the advantages of a mechanical joint while not limiting the use of modified joint accessories.

Other objects of this invention will be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENTS

Figure 1:
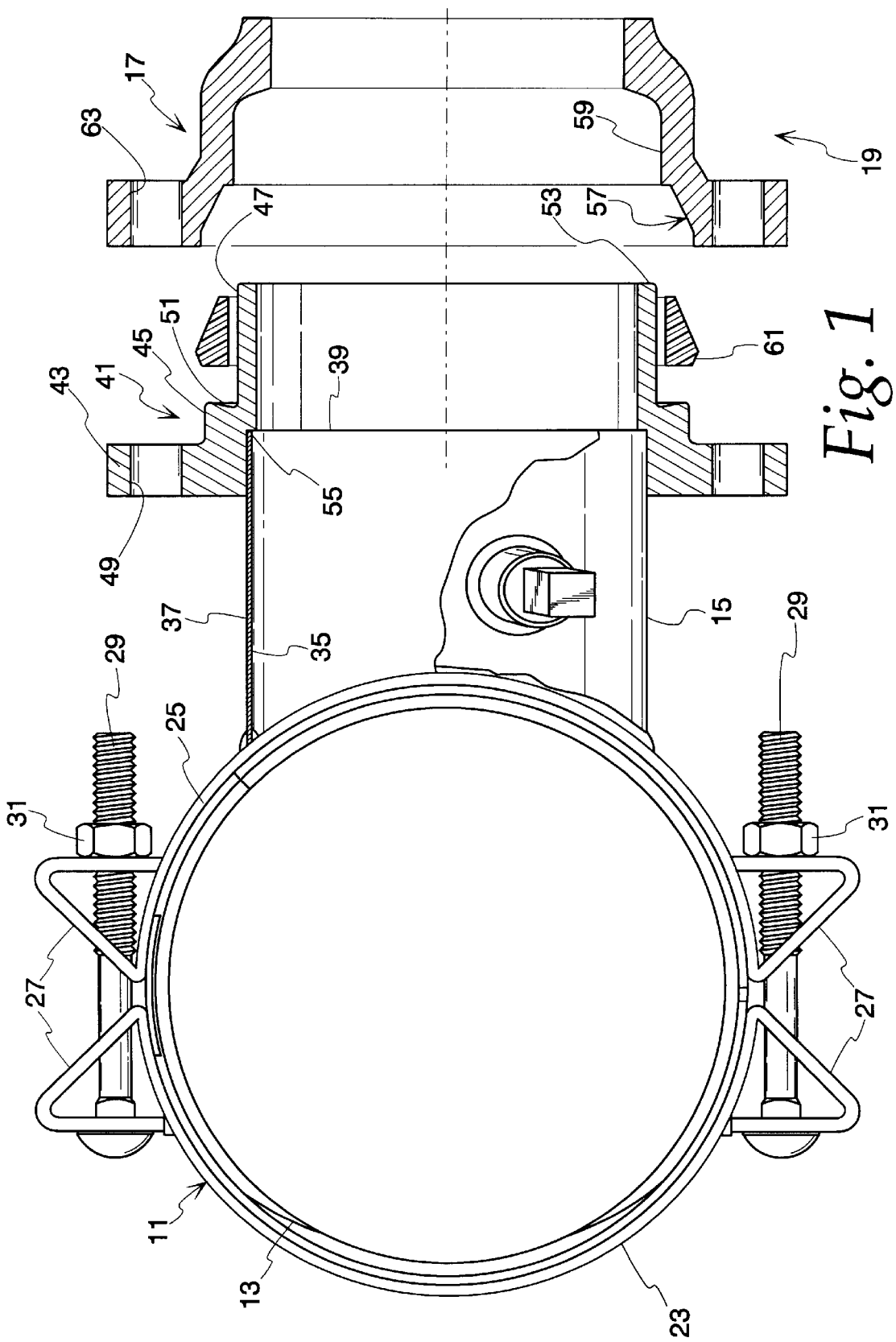
FIG. 1 is an exploded, elevational view partially in cross section showing the tapping sleeve of this invention connected to a main pipe of a fluid supply system and positioned for connection to a standard mechanical joint gate valve.

As shown in FIG. 1 of the drawings, a first embodiment of the invention includes a tapping sleeve 11 which surrounds a main fluid supply pipe 13. The tapping sleeve has a branch outlet pipe 15 which connects to a gate valve 17 having mechanical joint end connections 19 on opposite sides thereof. The mechanical joint valve outlet, which is not shown, connects the gate valve to an outlet distribution pipe which also is not shown, but which is conventional.

The tapping sleeve 11 shown herein is formed of one or more semi-cylindrical sections 23 and 25. However, smaller diameter tapping sleeves may have a single longitudinal split cylindrical section. The cylindrical sections or section are equipped with bolt lugs 27. Holes are provided through the bolt lugs but are not shown in the drawings. Bolts 29 pass through the aligned holes in the bolt lugs, through washers, also not shown, and through nuts 31 threaded on the bolts 29 to secure the semi-cylindrical sections 23 and 25 in water-tight contact with the main pipe 13. A tapping sleeve of this type is shown in my U.S. Pat. No. 5,374,087, issued Dec. 20, 1994. Other bolt lug designs for tapping sleeves have bolts welded to the lugs which bolts pass through two aligned plate members on the opposing lug. The tapping sleeve 11 of this invention may also be used with "weld on" branch outlet pipes. The branch outlet pipe 15 has a wall 35 with an outer surface 37. The wall 35 terminates in an outlet opening 39.

The mechanical joint valve adaptor 41 of this invention is formed with an integral flange 43, a shoulder 45 extending forwardly of the flange and a spout 47 projecting forwardly of the shoulder. Elongated bolt receiving passages 49 are formed in the flange 43. The shoulder 45 has an inwardly inclined annular face 51 and the spout terminates in an outlet 53. An internal annular shoulder 55 in the adaptor 41 engages the outlet opening 39 of the branch outlet pipe. The adaptor 41 may be welded or otherwise attached to the branch outlet pipe 15 if the branch outlet is metal or adhered thereto by a suitable adhesive if the branch outlet pipe is plastic. The spout 47 extends into a mechanical joint socket 59 formed in the mechanical joint flange 57 so that the spout 47 is supported by or supports the gate valve 17.

The adaptor 41 is connected to the gate valve 17 by T-bolts (not shown) which extend through aligned passages 49 and 63 in the adaptor flange 43 and in the mechanical joint flange 57. A mechanical joint gasket 61 fits into the joint flange 57 and fits over the spout 47 of the sleeve 41 as is most clearly shown in the drawings.

The adaptor 41 of this invention eliminates the need for attaching a retaining ring to the branch outlet pipe. Instead, the adaptor may be attached directly to the branch outlet pipe 15. Formed integrally with the sleeve is the shoulder 45. The shoulder has an inclined annular face 51 which is positioned to engage the mechanical joint gasket 61 of the gate valve 17. Also, other changes to the mechanical parts of the tapping sleeve assembly may be made in accordance with the knowledge of one skilled in the art without departing from the novel aspects of this invention.

Figure 2:
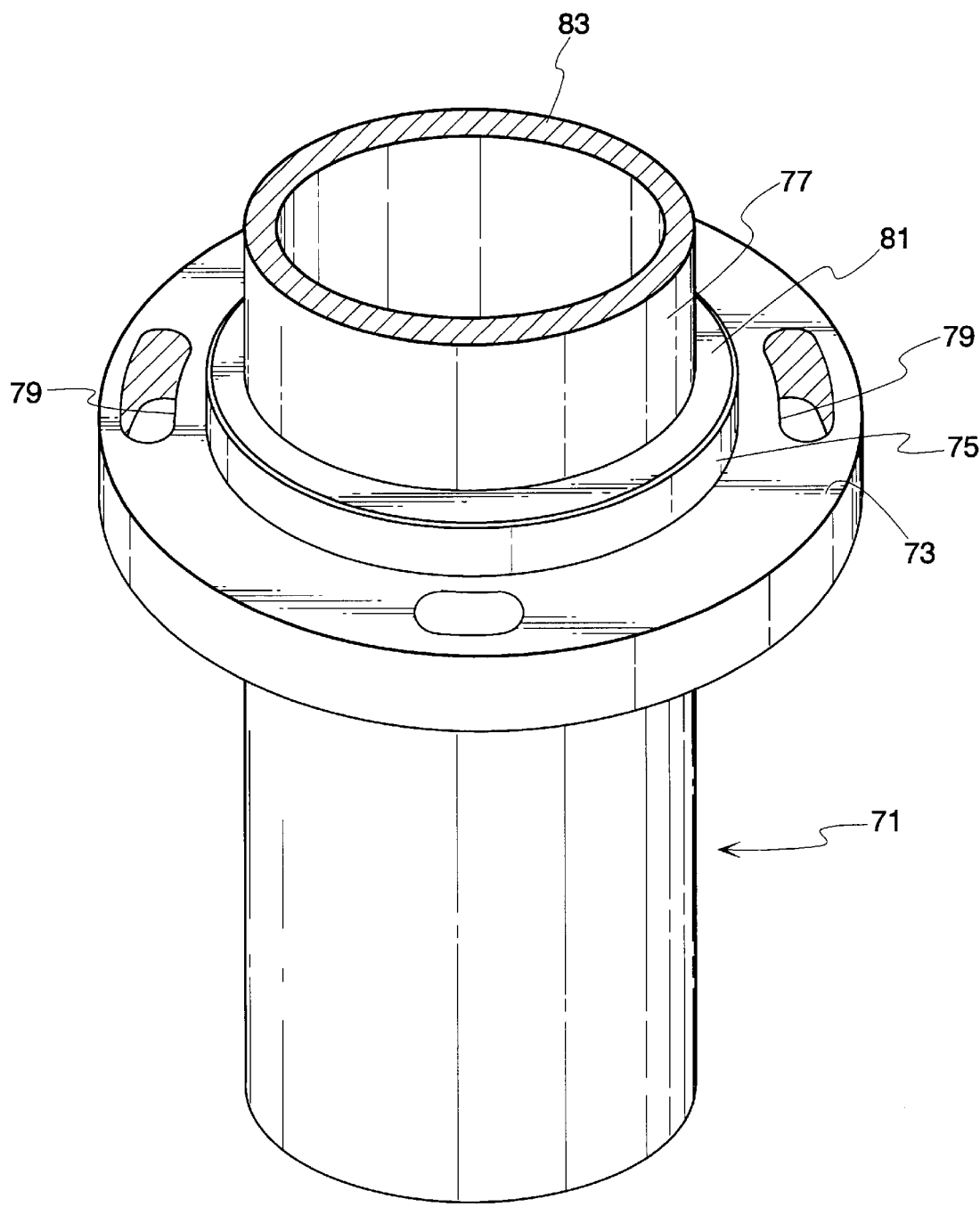
FIG. 2 is an orthographic view of a modified form of branch outlet pipe.

A second embodiment of the invention is shown in FIG. 2 of the drawings. The branch outlet pipe 71 of this embodiment is formed with an integral flange 73, an integral shoulder 75 extending forwardly of the flange and an integral spout 77 projecting forwardly of the shoulder. Elongated bolt receiving passages 79 are formed in the flange 73. The shoulder 75 has an inwardly inclined face 81 and the spout terminates in an outlet 83. The branch outlet pipe 71 is attached, usually by welding, to the semi-cylindrical section 25 of the tapping sleeve The branch outlet pipe 71 is connected to a mechanical joint gate valve by T-bolts (not shown) which extend through aligned bolt receiving passages 79 in the flange 73 and corresponding bolt receiving passages (not shown) in the mechanical joint flanges of the gate valve which is not shown. A mechanical joint gasket fits into the joint flange of the gate valve and fits over the spout 77 of the branch outlet pipe 71.

Figure 3:
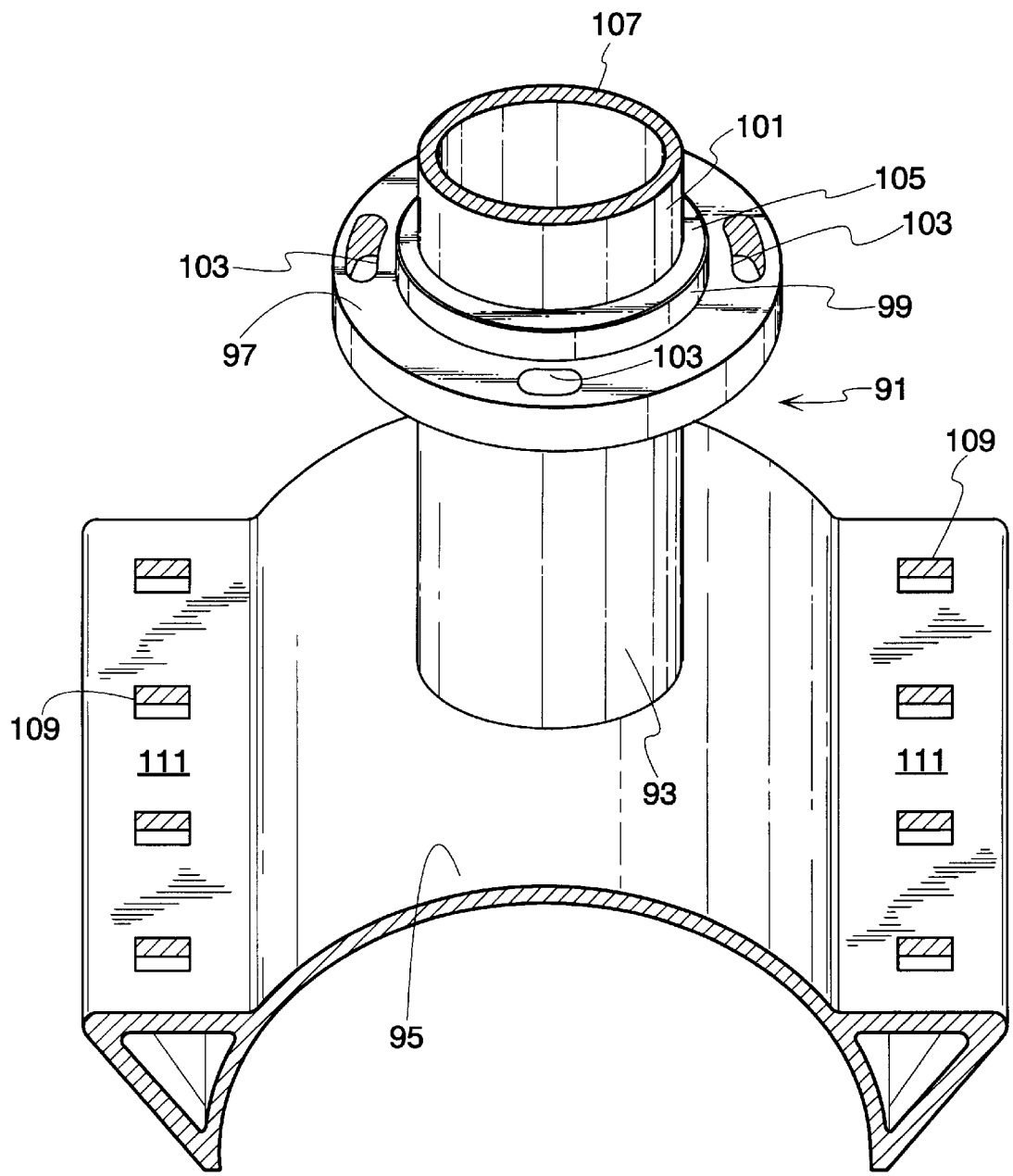
FIG. 3 is an orthographic view of yet another embodiment of the tapping sleeve of the invention.

A third embodiment of the invention is shown in FIG. 3 of the drawings. The tapping sleeve 91 of this embodiment of the invention includes a branch outlet pipe 93 which is integrally formed with a tapping sleeve semi-cylindrical section 95 which fits around one side of a main fluid supply pipe 13. The branch outlet pipe 93 is also formed with an integral flange 97, an integral shoulder 99 extending forwardly of the flange 97 and an integral spout 101 projecting forwardly of the shoulder 99. Elongated bolt receiving passages 103 are formed in the flange 97. The shoulder 99 has an inwardly inclined face 105 and the spout terminates in an outlet 107.

The tapping sleeve 91 is attached to the main fluid supply pipe 13 by fastening its semi-cylindrical section 95 to the semi-cylindrical section 23 positioned on the opposite side of the main fluid supply pipe 13. Bolts such as the bolts 29 shown in FIG. 1 of the drawings pass through aligned holes 109 in the bolt lugs 111 of the semi-cylindrical section 95 and through similar aligned holes in the semi-cylindrical section 23 and are secured by washers and bolts (not shown) to secure the semi-cylindrical sections 23 and 95 in water-tight contact with the main pipe 13.

The branch outlet pipe 93 is connected to a mechanical joint gate valve by T-bolts (not shown) which extend through aligned bolt receiving passages 103 in the flange 97 and corresponding bolt receiving passages (not shown) in the mechanical joint flange of the gate valve which is not shown. A mechanical joint gasket (not shown) fits into the joint flange of the gate valve and fits over the spout 101 of the branch outlet pipe 91.

Figure 4:
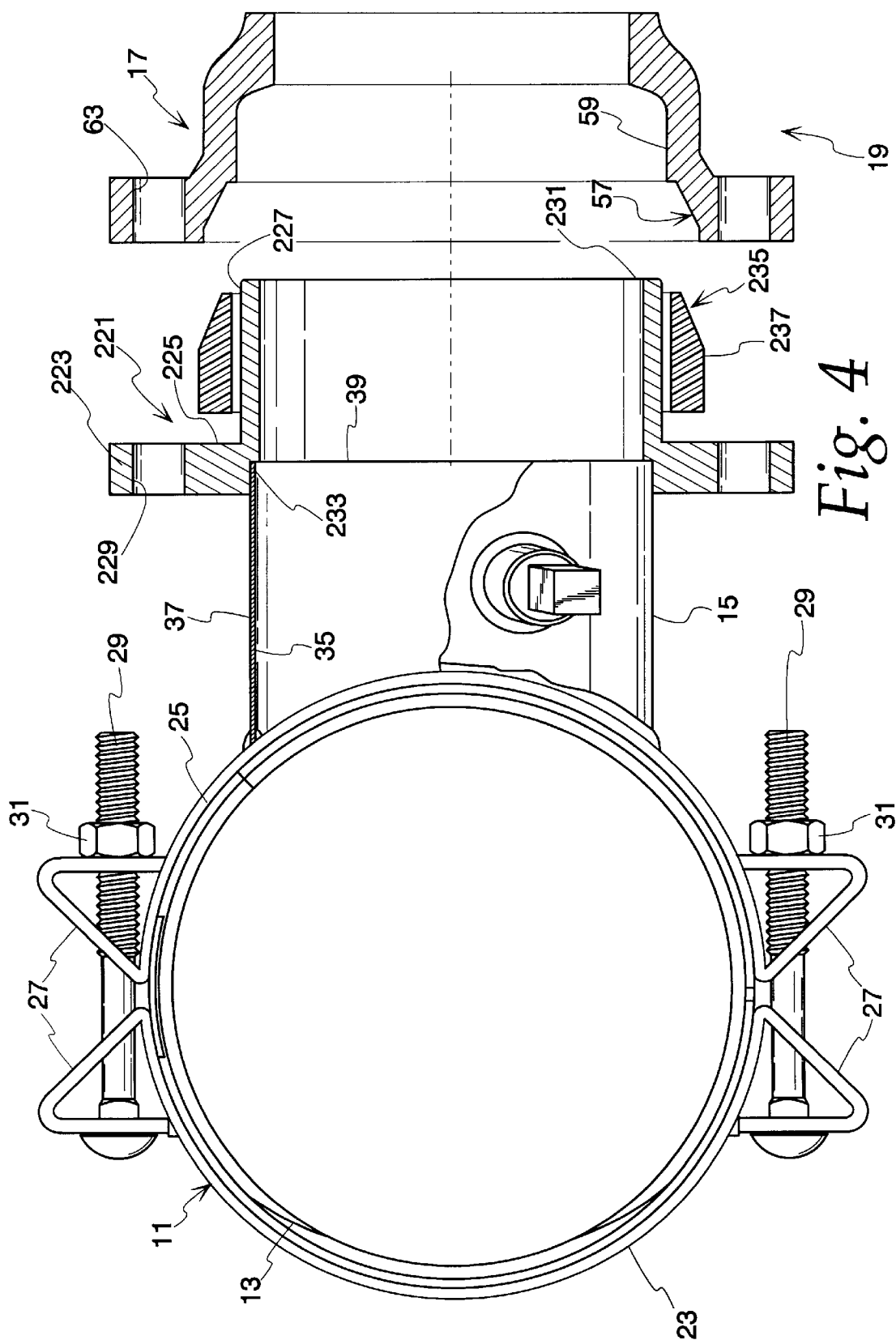
FIG. 4 is an exploded, elevational view partially in cross section showing another modified adaptor of this invention.

A fourth embodiment of the invention is shown in FIG. 4 of the drawings. The tapping sleeve 11 shown therein is identical in construction and function to the sleeve shown and discussed in connection with the embodiments of FIGS. 1–3 of the drawings. The same parts carry the same numbers and modified parts will have their own numbers. The mechanical joint valve adaptor 221 of this fourth embodiment of the invention is formed with an integral flange 223, an annular surface 225 is formed on this flange and a spout 227 projects forwardly of the annular surface 225. Elongated bolt receiving passages 229 are formed in the flange 223 outwardly of the annular surface 225. The spout 227 terminates in an outlet 231. An internal shoulder 233 in the adaptor 221 engages the outlet opening 39 of the branch outlet pipe. The adaptor 221 may be welded or otherwise attached to the branch outlet pipe 15 if the branch outlet pipe is metal or it may be adhered thereto by a suitable adhesive if the branch outlet pipe is plastic. The spout 227 extends into a mechanical joint socket 59 formed in the mechanical joint flange 57 of the gate valve 17 so that the spout 227 is supported by or supports the gate valve 17.

The adaptor 221 is connected to the gate valve 17 by T-bolts (not shown) which extend through aligned passages 229 and 63 in the adaptor flange 223 and in the mechanical joint flange 57. An axially elongated mechanical joint gasket 235 seats in the mechanical joint flange 57 and fits over the spout 227. The gasket 235 includes an axially elongated body portion 237 which is sufficiently long to span the space between the mechanical joint flange 57 and the annular surface 225 of the flange 223 when the T-bolts are tightened to draw together the adaptor 221 and the gate valve 17. The gasket 235 may be reinforced if operating pressures and/or conditions dictate.

Figure 5:
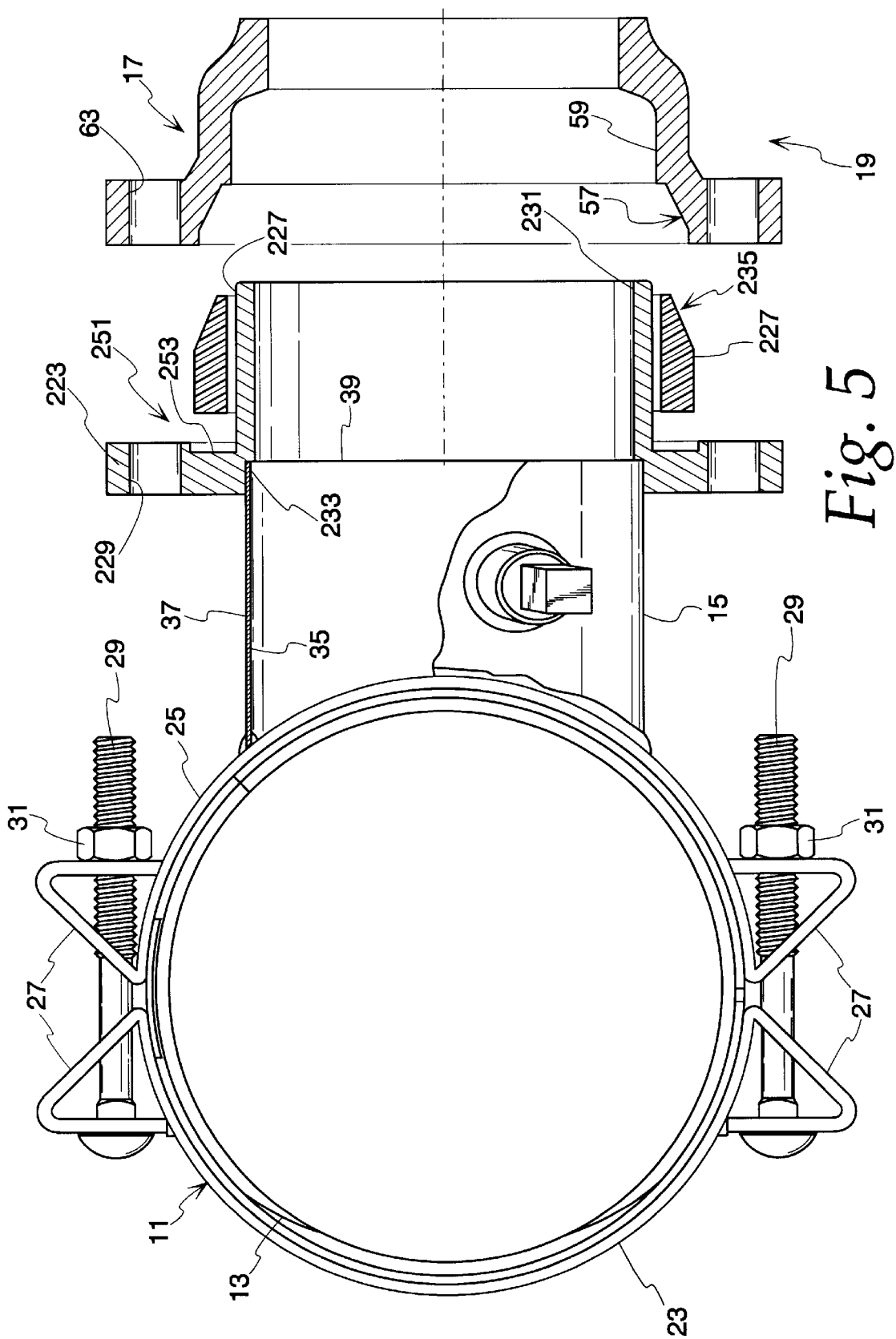
FIG. 5 is an exploded, elevational view partially in cross section showing a further modified adaptor of this invention.

A fifth embodiment of the invention is shown in FIG. 5 of the drawings. The tapping sleeve 11 shown in this embodiment is identical in construction to the sleeve 11 shown and described in the embodiments of FIGS. 1–3 and the elements thereof are identified by the same numbers. The mechanical joint valve adaptor 251 of this embodiment is similar to the adaptor of the embodiment of FIG. 4 with the elements that are the same generally bearing the same numbers and modified elements having different numbers. The adaptor 251 includes an integral flange 223 with a recessed annular surface 253 formed on the flange and facing the gate valve 17. A spout 227 projects forwardly of the flange 223 and the recessed annular surface 253. Elongated bolt receiving passages 229 are formed in the flange 223 outwardly of the recessed annular surface 253. The spout terminates in an outlet 231. An integral shoulder 233 in the adaptor 251 engages the outlet opening 39 of the branch outlet pipe 15. The adaptor 253 may be welded or otherwise attached to the branch outlet pipe if the branch outlet pipe is metal or adhered thereto by a suitable adhesive if the branch outlet pipe is plastic. The spout 227 extends into a mechanical joint socket 59 formed in the mechanical joint flange 57 of the gate valve 17 so that the spout is supported by or supports the gate valve 17.

The adaptor 251 is connected to the gate valve 17 by T-bolts (not shown) which extend through aligned passages 229 and 63 in the adaptor flange 223 and in the mechanical joint flange 57 respectively. An axially elongated mechanical joint gasket 235 seats in the mechanical joint flange 57 and fits over the spout 227. The gasket 235 includes an axially elongated body portion 237 which is sufficiently long to span the space between the mechanical joint flange 57 and the recessed annular surface 253 of the flange 223 when the T-bolts are tightened to connect the adaptor 251 to the gate valve 17. The gasket 235 may be reinforced if operating pressure and/or conditions dictate.

Figure 6:
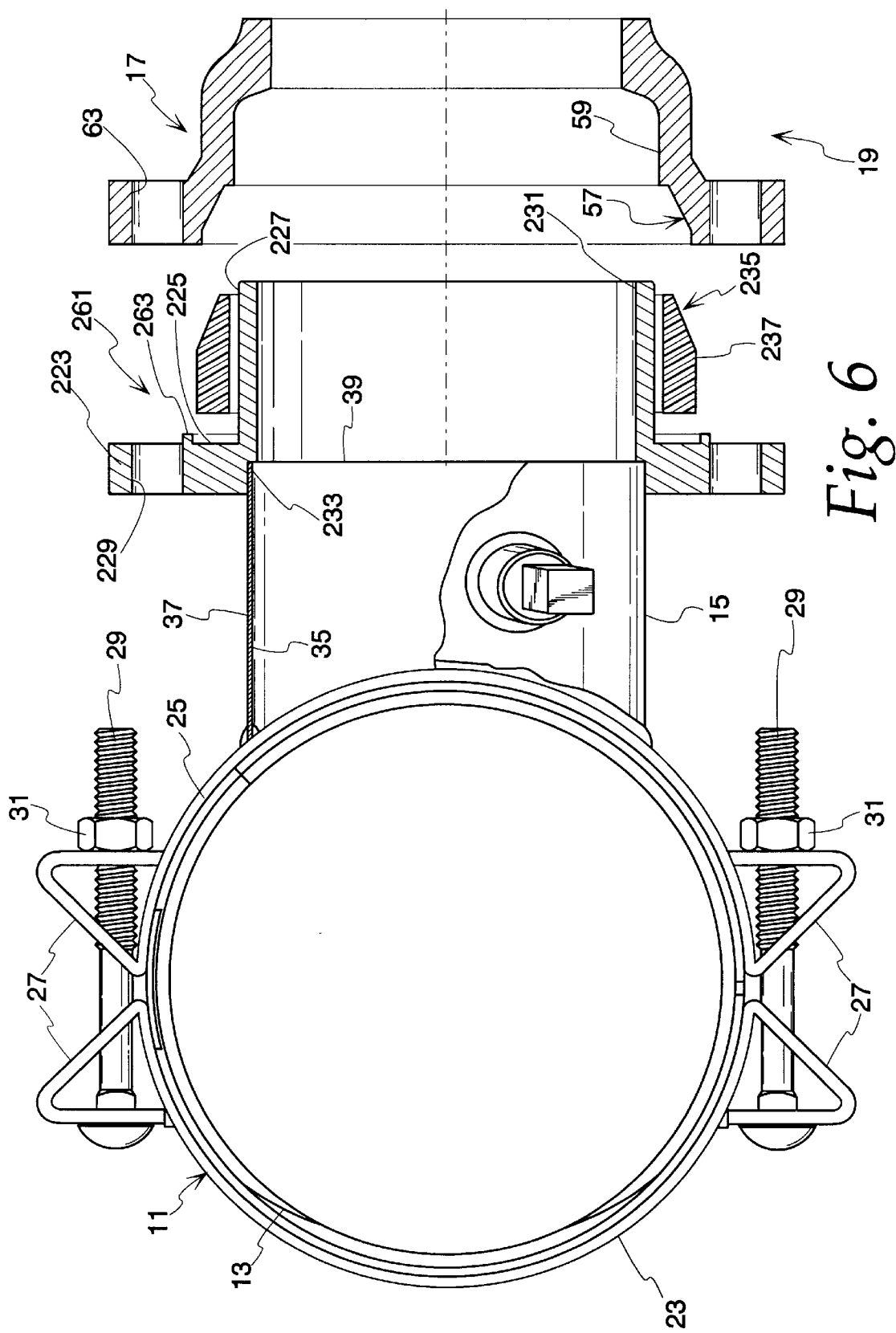
FIG. 6 is an exploded, elevational view partially in cross section showing a further modified adaptor of this invention.

A sixth embodiment of the invention is shown in FIG. 6 of the drawings. The tapping sleeve 11 is identical in construction to the sleeve shown and described in the embodiment of FIGS. 1–3 and the parts are identified by the same numbers. The mechanical joint valve adaptor 261 of this embodiment of the invention is similar to the embodiment of FIG. 4 with the elements that are the same bearing the same numbers and the elements that are modified are assigned different numbers. The adaptor 261 includes an integral flange 223 with an annular surface 225. A rim 263 is formed on the flange outwardly of the annular surface. A spout 227 projects forwardly of the annular surface 225 and rim 263. Elongated bolt receiving passages 229 are formed in the flange. 223 axially outwardly of the annular surface 225. The spout terminates in an outlet 231. Internal shoulder 233 in the adaptor 261 engages the outlet opening 39 of the branch outlet pipe 15. The adaptor 261 may be welded or otherwise attached to the branch outlet pipe if the branch outlet pipe is metal or adhered thereto by a suitable adhesive if the branch outlet pipe is plastic. The spout 227 extends into a mechanical joint socket 59 formed in the mechanical joint flange 57 of the gate valve 17 so that the valve spout 227 is supported by or supports the gate valve 17.

The adaptor 261 is connected to the gate valve 17 by T-bolts (not shown) which extend through aligned passages 229 and 63 in the adaptor flange 223 and in the mechanical joint flange 57 respectively. An axially elongated mechanical joint gasket 235 seats in the mechanical joint flange 57 and fits over the spout 227. The gasket 235 includes an axially elongated body portion 237 which is sufficiently long to span the space between the mechanical joint flange 57 and the annular surface 225 of the flange 223 when the T-bolts are tightened to connect the adaptor 261 to the gate valve 17. The gasket 235 may be reinforced if operating pressures and/or conditions dictate.

I claim:

1. A tapping sleeve assembly for direct connection to a mechanical joint gate valve, said assembly including:

a tapping sleeve attached to a main pipe, an outlet conduit having an outer surface, said outlet conduit fastened to and extending outwardly from said tapping sleeve, said outlet conduit terminating in an outlet at its distal end, an adaptor mounted over said outlet conduit and fastened thereto, said adaptor having a flange with bolt receiving passages extending therethrough, an annular face located radially inwardly of said bolt receiving passages and a spout extending axially of said flange, a gate valve having a mechanical joint socket facing said spout, a seal in said socket and engaging said annular face of said flange, said gate valve having a mechanical joint flange surrounding said mechanical joint socket, and bolts attaching said flange of said adaptor to said mechanical joint flange of said gate valve.

2. The tapping sleeve assembly of claim 1 in which said spout extends into said gate valve to support said gate valve.

3. The tapping sleeve assembly of claim 1 in which said annular face of said flange is recessed.

4. The tapping sleeve assembly of claim 1 in which an annular rim is formed radially outwardly of said annular face of said flange.

5. A tapping sleeve assembly for direct connection to a mechanical joint gate valve, said assembly including:

a tapping sleeve attached to a main pipe, an outlet conduit extending outwardly from said tapping sleeve, said outlet conduit having a spout formed integrally therewith, a flange with bolt receiving passages extending therethrough, an annular face formed on said flange radially inwardly of said bolt receiving passages and an outlet formed at the distal end of said spout, a gate valve having a mechanical joint socket facing said spout, a seal in said socket, said seal engaging said annular face of said flange, said gate valve having a mechanical joint flange surrounding said mechanical joint socket, and bolts attaching said flange of said outlet conduit to said mechanical joint flange of said gate valve.

* * * * *